(12) United States Patent
Godbillon et al.

(10) Patent No.: US 6,231,221 B1
(45) Date of Patent: *May 15, 2001

(54) INDICATING LIGHT UNIT WITH A FLUX RECOVERY AND DISTRIBUTOR MECHANISM DISPOSED BETWEEN A LIGHT SOURCE AND AN OPTICAL PLATE THAT CONTROLS ILLUMINATION OF THE ILLUMINATING AREA, AND A METHOD OF MANUFACTURING THE MECHANISM FOR A LIGHT UNIT OF THIS KIND

(75) Inventors: Vincent Godbillon, Paris; Christian Montelymard, Saint Gratien, both of (FR)

(73) Assignee: Valeo Vision, Bobigny Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,736

(22) Filed: Dec. 4, 1998

(30) Foreign Application Priority Data

Dec. 5, 1997 (FR) .................................................. 97 15394

(51) Int. Cl.⁷ ...................................................... F21V 5/00
(52) U.S. Cl. ........................... 362/521; 362/334; 362/520; 362/331
(58) Field of Search .................................... 362/521, 331, 362/334, 540, 520, 333

(56) References Cited

U.S. PATENT DOCUMENTS

4,899,261 * 2/1990 Blusseau et al. ..................... 362/521
5,287,101 * 2/1994 Serizawa .......................... 340/815.76

FOREIGN PATENT DOCUMENTS

0 193 294    9/1986  (EP) .
2 614 969   11/1988  (FR) .

OTHER PUBLICATIONS

French Search Report dated Aug. 14, 1998 Patent Abstracts of Japan vol. 016, No. 051 (M–1209), Feb. 10, 1992 & JP 03 254004 A (Stanley Electric Co. Ltd), Nov. 13, 1991.

* cited by examiner

Primary Examiner—Alan Cariaso
Assistant Examiner—Ronald E. Delgizzi
(74) Attorney, Agent, or Firm—Morgan & Finnegan LLP

(57) ABSTRACT

A motor vehicle indicating light unit comprises a light source, an optical plate having optical arrangements to redirect the light from the region of the source so that it propagates with a mean direction generally parallel to a horizontal optical axis and a flux recovery and distributor bonnet disposed between the source and the optical plate. The bonnet assures a given distribution of the light onto the inside surface of the optical plate in at least a given direction. The optical plate is curved and has optical arrangements having different light transmission coefficients. The bonnet assures the given distribution of light which allows for the different transmission coefficients to obtain an evolution of the illumination at the exit from the plate in the given direction that satisfies a predetermined law.

13 Claims, 3 Drawing Sheets

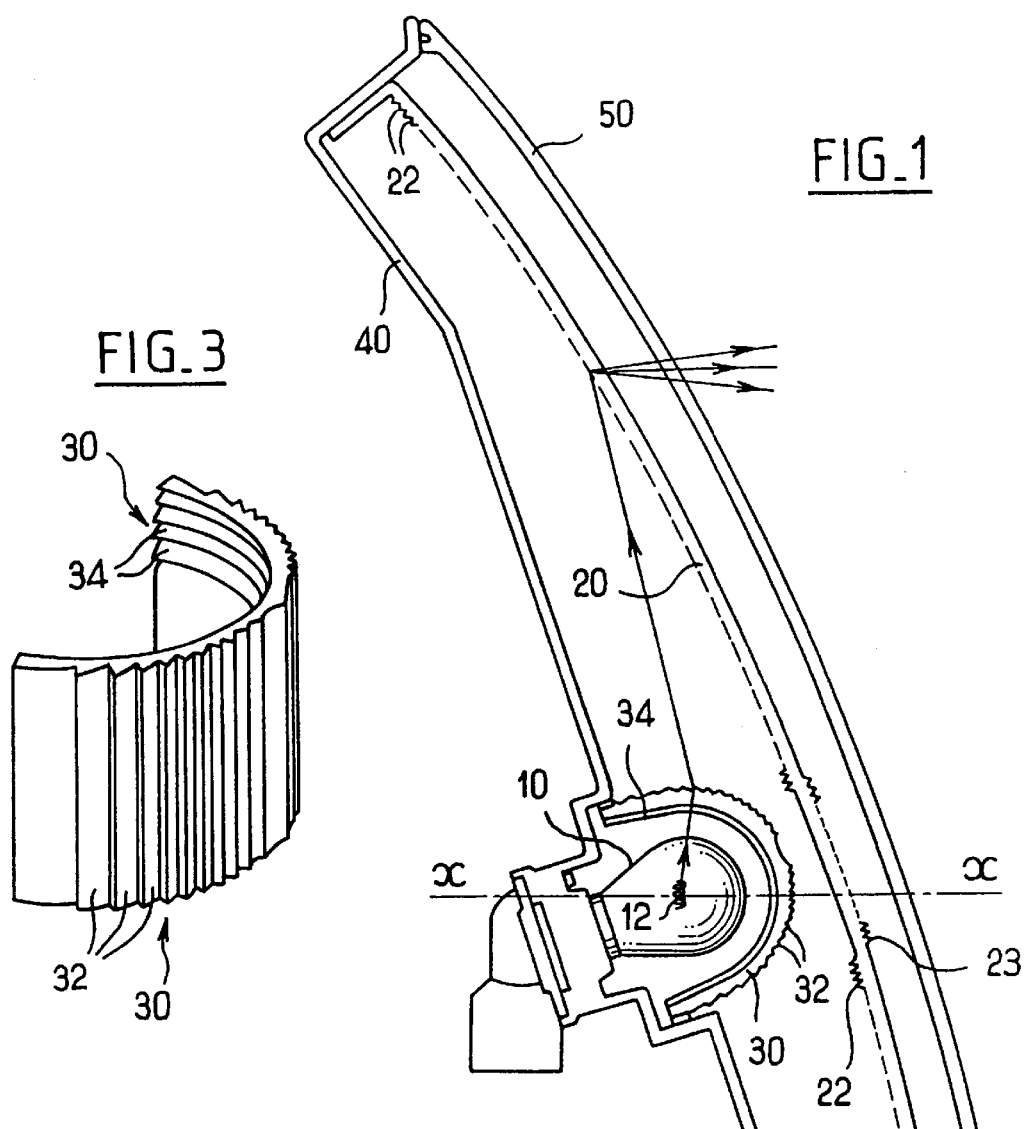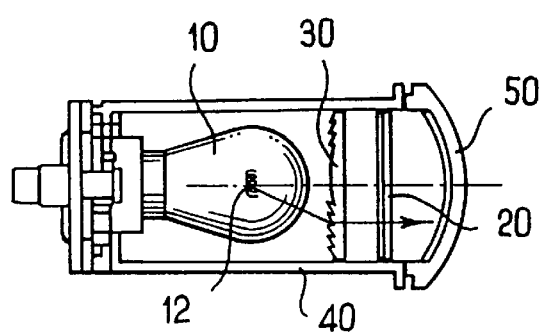

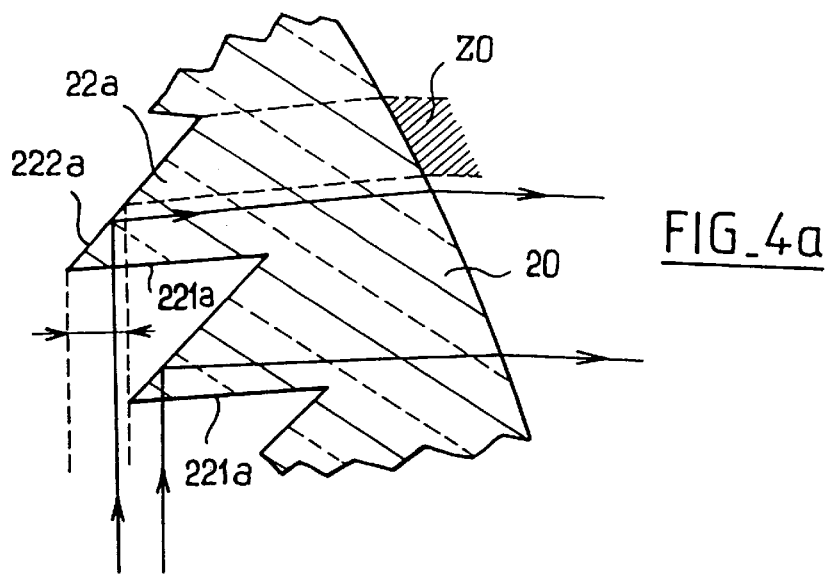
FIG_4a
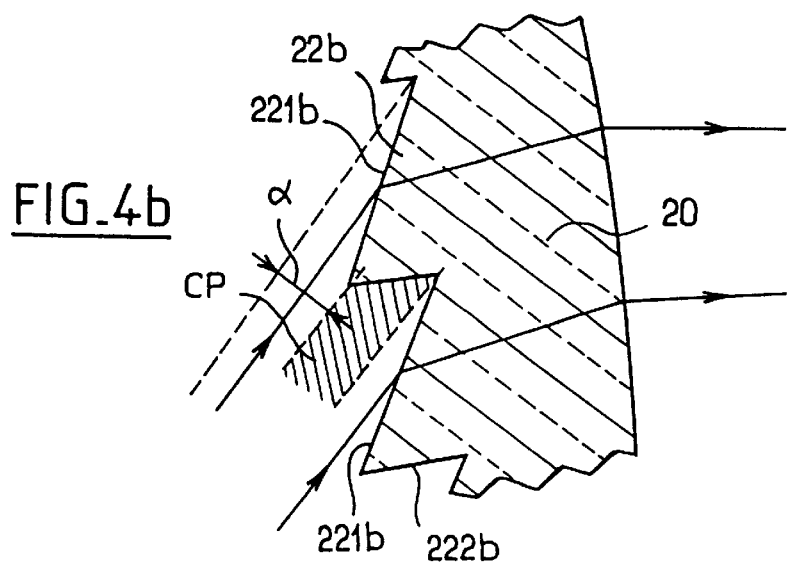
FIG_4b
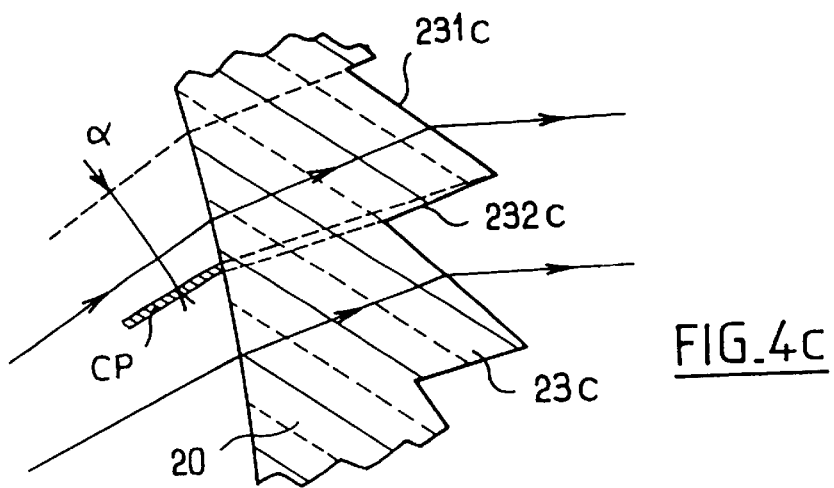
FIG_4c

INDICATING LIGHT UNIT WITH A FLUX RECOVERY AND DISTRIBUTOR MECHANISM DISPOSED BETWEEN A LIGHT SOURCE AND AN OPTICAL PLATE THAT CONTROLS ILLUMINATION OF THE ILLUMINATING AREA, AND A METHOD OF MANUFACTURING THE MECHANISM FOR A LIGHT UNIT OF THIS KIND

FIELD OF THE INVENTION

The present invention is generally concerned with indicating light units of motor vehicles and, more particularly, with a new method of manufacturing an indicating light unit having an illuminating area with a luminous intensity that can be accurately controlled. In particular, the indicator light unit has an illuminating area with a luminous intensity that is perceived as homogeneous by the eye of an observer over a substantial part thereof

BACKGROUND OF THE INVENTION

Document FR-A-2 614 969 describes an indicating light unit comprising a single light source, a light processing or flux recovery and distributor mechanism relatively close to and surrounding the bulb, and a generally flat glass or lens.

The flux recovery and distributor mechanism is designed to modify the homogeneous angular distribution of the light emitted by the bulb all around it into a homogeneous distribution of the light, in linear terms, along at least one direction of the lens.

The lens comprises optical members in the form of striations defining steps of a cylindrical Fresnel lens, for example, designed to redirect the light from the flux recovery and distributor mechanism towards the required signaling area, generally determined by regulations.

Accordingly, the above prior art indicating light unit has a more homogeneous distribution of the light leaving the lens than a light unit with no such flux recovery and distributor mechanism, because the areas of the lens closest to the bulb in a light unit without a flux recovery and distributor mechanism receive a significantly greater quantity of light per unit surface area than areas of the lens further from the bulb.

However, the indicating light unit according to FR-A-2 614 969 has the required homogeneity properties only if the lens is substantially flat. There is nothing in the above document to indicate or to suggest how to deal with the situation in which the lens is curved, which is more and more frequently required in modem motor vehicles.

What is more, it is apparent that the striations formed on the lens can have greatly varying light transmission coefficients, according to the deflection that they are required to provide.

This also contributes to the homogeneity of a prior art indicating light unit of the type with a flux recovery and distributor mechanism being less than perfect, despite the effect of the flux recovery and distributor mechanism.

DISCUSSION OF THE INVENTION

The present invention aims to mitigate the above limitations of the prior art and to provide an indicating light unit that can include a lens which can be highly curved and have optical deflector arrangements with significantly different transmission characteristics, although said lens has a homogeneity of illumination that can be accurately controlled. In particular, the illumination can be homogeneous over a wide range.

Accordingly, the present invention proposes a motor vehicle indicating light unit comprising a light source, an optical plate having optical arrangements adapted to redirect light from the region of the source so that it propagates with a mean direction generally parallel to a horizontal optical axis, and a flux recovery and distributor mechanism disposed between the source and the optical plate. The flux recovery and distributor mechanism is adapted to assure a given distribution of light onto the inside surface of the optical plate in at least a given direction, wherein the optical plate is curved and has optical arrangements having different light transmission coefficients. The flux recovery and distributor mechanism assures the given light distribution which allows for the different transmission coefficients to obtain an evolution of the illumination at the exit from the plate in the given direction that satisfies a predetermined law.

The optical arrangements advantageously have transmission coefficients that change stepwise in accordance with their position in the given direction. The light distribution imparted by the flux recovery and distributor mechanism also changes stepwise in the given direction.

In one particular embodiment, it is preferable in at least one area of the plate for the transmission coefficients of the optical arrangements to vary progressively, and for the given light distribution in the area to be adapted to compensate this progressive variation to assure an essentially constant level of illumination in the area.

In another aspect, the invention proposes a method of manufacturing a motor vehicle indicating light unit comprising a light source, a curved optical plate having first optical arrangements adapted to redirect light from the region of the source so that it propagates with a mean direction generally parallel to a horizontal optical axis, the first optical arrangements having different light transmission coefficients, and a flux collecting and distributing mechanism disposed between the source and the optical plate and having second optical arrangements adapted to assure a given distribution of light on the inside surface of the optical plate in at least one given direction. The method comprises the steps of:

establishing a law of evolution of the transmission coefficients of the optical arrangements in accordance with at least one of their coordinates on the plate;

establishing a required law of evolution of the illumination of the light unit as a function of the coordinate(s) on the plate;

establishing by combining said laws a relation between the orientation of a ray from the source impinging on the second optical arrangements and the at least one coordinate;

defining the geometry of the second optical arrangements as a function of the relation;

making a mold for the flux recovery and distributor mechanism using the geometry; and molding the flux recovery and distributor mechanism using the mold.

The definition step advantageously consists of defining a successive plurality of second adjacent optical arrangements in accordance with laws of refraction and/or of total reflection.

The relation is preferably:

$$s = k1(s) \cdot k2(s) \cdot \theta$$

where:

s is a curvilinear coordinate of the curved optical plate;

k1(s) is said law of evolution of the illumination;

k2(s) is said law of evolution of the transmission coefficients; and

θ is an angle measured relative to a reference defining the orientation of a ray from the source.

Other aspects, aims and advantages of the present invention will become more apparent on reading the following detailed description of preferred embodiments of the invention given by way of example and with reference to the accompanying drawings.

BRIEF DESCRIPTION OF THE DRAWINGS

FIG. 1 is a diagrammatic view in horizontal section of an indicating light unit in accordance with the present invention;

FIG. 2 is a diagrammatic view of the indicating light unit from FIG. 1 in vertical section;

FIG. 3 is a perspective view of an optical processing or flux recovery and distributor mechanism that is part of the indicating light unit from FIGS. 1 and 2;

FIGS. 4a through 4c are detail view showing three types of optical arrangements of an intermediate plate of an indicating light unit in accordance with the invention and their respective optical behaviors.

DESCRIPTION OF PREFERRED EMBODIMENTS OF THE INVENTION

Figure 5A:
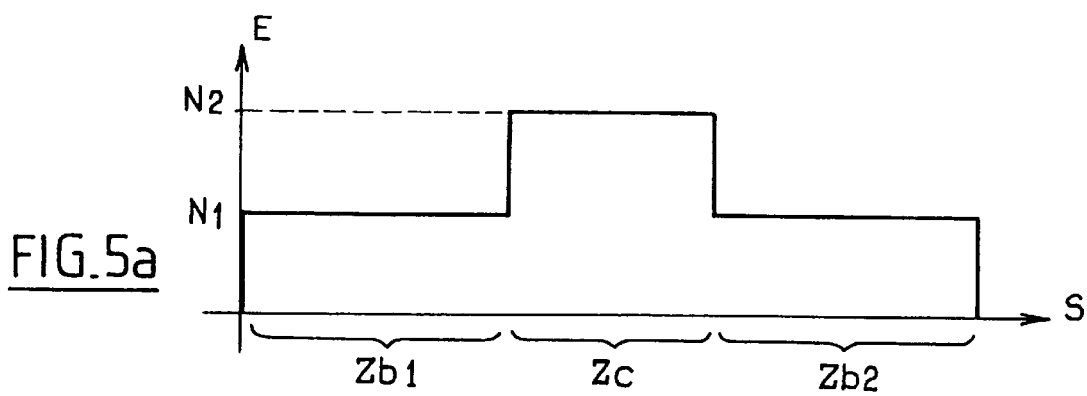
FIGS. 5a through 5d show different optical behaviors of indicating light units in accordance with the invention in terms of the illumination of their illuminating areas.

FIGS. 1 to 3 show an indicating light unit that comprises a housing 40 closed by a glass or lens 50, a bulb 10 with an incandescent filament 12 mounted in the housing, an intermediate optical plate 20 extending essentially along the lens and a generally cylindrical flux recovery and distributor mechanism 30 closely surrounding the bulb 10.

The lens 50 and the plate 20, which are at a substantially constant distance from each other, have a curved shape with the concave side facing inwards.

Note also that the light unit is very wide but small in height to generate an elongated horizontal illuminating area, which is beneficial from the points of view of styling and overall size, in particular.

The flux recovery and distributor mechanism 30 has optical arrangements on the inside in the form of generally circular striations 34 espousing the inside face of the flux recovery and distributor mechanism. The shape of the optical arrangements in vertical section corresponds to that of a cylindrical Fresnel lens. The arrangements are adapted to redirect light rays emitted by the filament 12 upwards and downwards so that they propagate in generally horizontal planes (see FIG. 2). On the other hand, the arrangements 34 have no significant effect on the horizontal distribution of the light.

The flux recovery and distributor mechanism 30 has arrangements 32 on its outside face designed to assure a particular horizontal distribution of the light travelling towards the optical plate, so that the variations in the illumination of the light unit horizontally along its illuminating area satisfy a predetermined law, as described in detail below.

The plate 20 has either internal optical arrangements 22 or external optical arrangements 23 for redirecting the light leaving the flux recovery and distributor mechanism 30, so that the light propagates with a mean direction parallel to the x-x axis of the light unit, generally corresponding to the longitudinal axis of the vehicle.

In accordance with one essential aspect of the invention, the law governing the horizontal distribution of the light by the arrangements 32 allows for the curvature of the plate 20 and for certain of its light transmitting properties.

In this connection, FIGS. 4a through 4c show the three main types of optical arrangements that can be provided on the plate 20.

In FIG. 4a, the arrangements 22a are vertical prisms on the inside face of the plate 20 adapted to redirect the incident light by total reflection at their face 222a, as shown.

This type of arrangement leads to only low losses (on the order of 4%) of the light entering their entry face 221a. On the other hand, each arrangement is partly masked by an adjoining member, from the point of view of the incident light, with the result that the output from the plate 20 features shadow areas Z0 corresponding to the parts of the faces 222a that are not exposed to the light.

Also, the coefficient of internal reflection at the face 222a can vary significantly with the geometry.

This type of arrangement is particularly suitable when the incident light is not strongly inclined to the orientation of the plate.

FIG. 4b shows another type of arrangement 22b operating by refraction.

Each element has an entry face 221b and a clearance face 222b.

As the figure shows, only some of the light (field subtending angle α) reaches the entry face of an arrangement 22b. The remainder of the light (lost field CP) enters the plate 20 via the associated clearance face 222b and does not contribute to the illuminating area of the light unit.

The resulting inherent transmission coefficient will generally be lower than that obtained with arrangements employing total reflection.

This type of arrangement is generally used when the incident light is at an intermediate inclination to the plate.

In both of the above cases, the outside face of the plate 20 in line with the elements 22a or 22b is preferably smooth.

Finally, FIG. 4c shows the situation in which the inside face of the plate is smooth and arrangements 23c operating by refraction are provided on its outside face. Arrangements 23c have an active face 231c and a clearance face 232c.

In both the above examples where the arrangements operate by refraction, there is generally a loss of light by reflection at the entry or exit face. The magnitude of the loss of light varies for a given material, principally in accordance with the entry and exit angles.

It will be understood from the foregoing comments that each optical arrangement provided on the plate 20 has its own coefficient of transmission of light between the entry face of the plate and its exit face, depending on its type.

Accordingly, with a given design of plate 20, there exists a law k2(s) that corresponds to the evolution of the coefficients of transmission of the various optical arrangements 22 or 23 in accordance with their horizontal position, which is given by the variable s which is the curvilinear abscissa of the plate 20.

A required law k1(s) of horizontal illumination of the lens is set which determines an evolution of the effective illumination at the exit from the lens 50 within the illuminating area of the light unit as a function of the same curvilinear abscissa s of the plate 20.

FIGS. 5a through 5d show examples of such laws, representing the level of illumination E as a function of the curvilinear abscissa s.

In FIG. 5a, the law is such that two edge areas Zb1 and Zb2 of the plate 20 have a first illumination level N1, and the central area Zc of the plate has a second illumination level N2, for example twice N1.

Figure 5B:
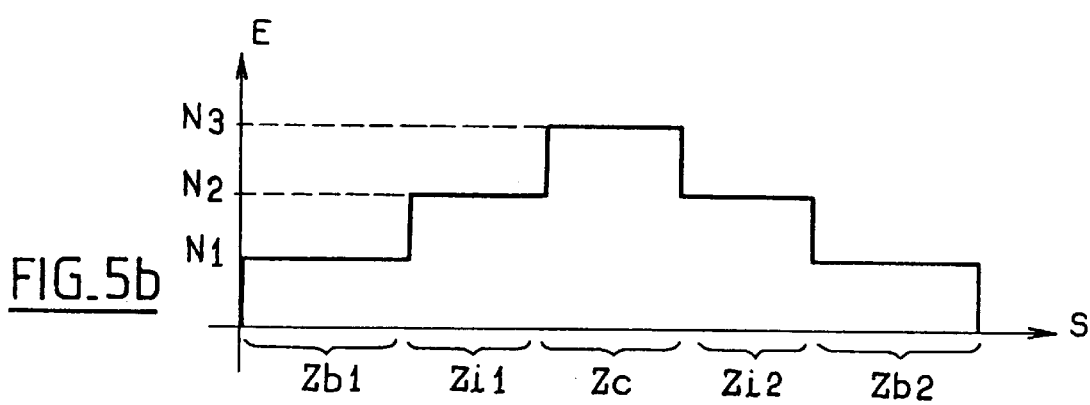

The same principle of stepped variation in the levels of illumination is retained in FIG. 5b, with a central area Zc of maximal level N3, two intermediate areas Zi1 and Zi2 of intermediate level N2 and two edge areas Zb1 and Zb2 of minimal level N1.

Figure 5C:
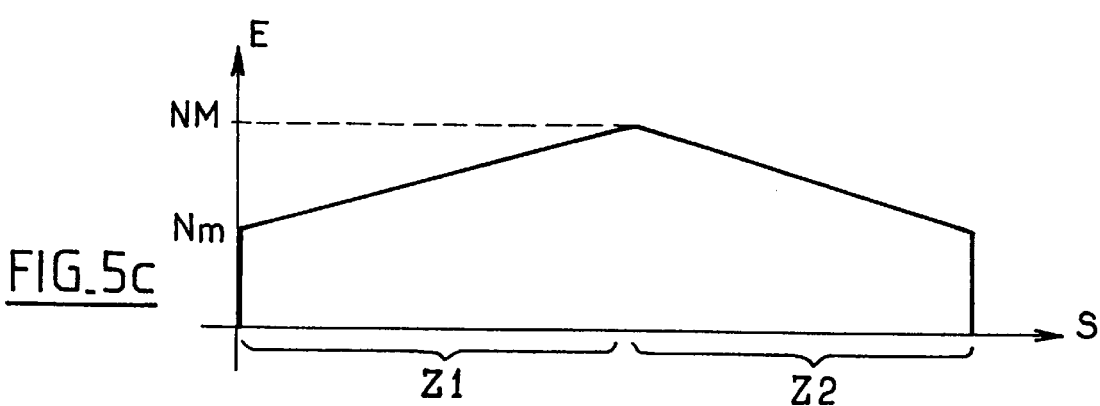

FIG. 5c shows the situation in which a progressive variation of the level of illumination as a function of the curvilinear abscissa s is required.

In this example a central point on the plate 20 corresponds to a maximal illumination level NM which decreases gradually towards a minimal illumination level Nm in the direction towards the lateral edges of the plate.

Figure 5D:
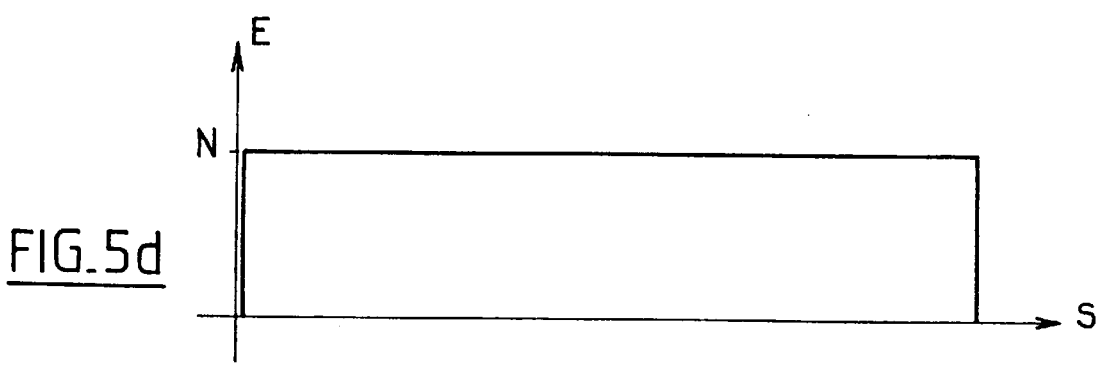

Finally, FIG. 5d shows the situation in which the level of illumination is essentially constant and equal to N over all of the horizontal extent of the illuminating area.

Of course, many other types of predetermined variation of the illumination as a function of the curvilinear abscissa can be envisaged.

Thus it is particularly advantageous to use as the illumination variation law a formula of the type:

$$k1(s)=1/(1+(s/smax)^2)$$

where smax denotes the curvilinear abscissa of the end of the illuminating area.

The above parameters having been defined, the following equation is now defined:

$$s=k1(s)-k2(s)\cdot\theta$$

where $\theta$ represents the angle to the x—x axis of the light ray impinging on the flux recovery and distributor mechanism 30.

The curvilinear abscissa s that the ray when deflected by the arrangements 32 of the flux recovery and distributor mechanism must reach on the plate 20 is then determined for each value of $\theta$.

The profile of the elements 32 is determined from this information.

In the simplest embodiment, the arrangements 32 are vertical prisms in which the inclination of the exit face to the mean angle of the portion of the incident light covered by that face determines to a first approximation the horizontal deflection required to cover an area of the plate 20 surrounding the target curvilinear abscissa.

The prisms are defined one after the other and their clearance faces are adjusted to minimize flux losses.

In a more sophisticated embodiment, the arrangements 32 are prisms-striations having a light exit face of controlled concavity or convexity.

Note that the lens 50 of the light unit can be either smooth or provided with optical light diffusing elements such as striations, balls, generally spherical balls, or toruses, preferably on its inside face.

Of course, the present invention is no way limited to the embodiments described hereinabove and shown in the drawings. The skilled person will know how to make any variant or modification thereof conforming to the spirit of the invention.

In particular, although the situation is described hereinabove in which the light unit has an intermediate optical plate 20 and a lens 50 extending generally alongside each other, it is clear that the plate 20 with the arrangements 22 or 23 can itself constitute the lens of the light unit.

Also, although the above description is particularly directed to the situation in which the flux recovery and distributor mechanism 30 operates on the horizontal distribution of the light on a horizontal elongated plate 20, it must be understood that the present invention equally applies to a distribution of the light on a lens elongated in any direction, in particular a vertical direction, and to situations in which particular distributions are achieved in two orthogonal directions.

What is claimed is:

1. A motor vehicle indicating light unit comprising:
   a light source;
   a curved optical plate including optical arrangements thereon having different light transmission coefficients which are adapted to redirect light from a region of said light source so that the redirected light propagates with a mean direction generally parallel to a horizontal optical axis; and
   a flux recovery and distributor mechanism disposed between said light source and said curved optical plate and adapted to provide a given distribution of light onto an inside surface of the curved optical plate for cooperating with said light transmission coefficients to obtain a predetermined evolution of the illumination at an exit from the curved optical plate.

2. The indicating light unit according to claim 1 wherein said optical arrangements have transmission coefficients that change stepwise in accordance with their position in a given direction, and said light distribution imparted by said flux recovery and distributor mechanism also changes stepwise in said given direction.

3. The indicating light unit according to claim 1 wherein in at least one area of said plate, the transmission coefficients of said optical arrangements vary progressively, and in said area, said given light distribution is adapted to compensate this progressive variation to provide a substantially constant level of illumination in said area.

4. A method of manufacturing a motor vehicle indicating light unit comprising a light source, a curved optical plate including first optical arrangements having different light transmission coefficients which are adapted to redirect light from a region of said light source so that the redirected light propagates with a mean direction generally parallel to a horizontal optical axis, and a flux collecting and distributing mechanism disposed between said light source and said curved optical plate, the flux collecting and distributing mechanism having second optical arrangements, adapted to provide a given distribution of light on an inside surface of said curved optical plate, for cooperating with said different light transmission coefficients to obtain a predetermined evolution of illumination at an exit from the curved optical plate, said method comprising the steps of:
   establishing an evolution of said transmission coefficients of said first optical arrangements in accordance with at least one of the coordinates of the first optical arrangements on said plate;
   establishing an evolution of the illumination of said light unit as a function of said coordinate(s) on said plate;
   establishing a relation between the orientation of a light ray from said light source impinging on said second optical arrangements and said at least one coordinate, by combining said evolution of the transmission coefficients and said evolution of the illumination;

defining a geometry of said second optical arrangements as a function of said relation;

making a mold for said flux recovery and distributor mechanism using said geometry of said second optical arrangements; and molding said flux recovery and distributor mechanism using said mold.

5. The method according to claim 4 wherein the step of defining a geometry comprises defining a successive plurality of second adjacent optical arrangements adapted to redirect light by refraction and/or total reflection.

6. The method according to claim 4 wherein said relation between the orientation of a light ray and said at least one coordinate is:

$$s = k1(s) \cdot k2(s) \cdot \theta$$

where s is a curvilinear coordinate of said curved optical plate;

k1(s) is said evolution of the illumination;

k2(s) is said evolution of said transmission coefficients; and $\theta$ is an angle measured relative to a reference defining said orientation of a light ray from said light source.

7. The indicating light unit according to claim 1 wherein said flux recovery and distributor mechanism has an inside surface closer to the light source, said flux recovery and distributor mechanism having circular striations thereon defining a cylindrical Fresnel lens configured to redirect light rays emitted by the light source upwards and downwards so that said light rays propagate in substantially horizontal planes.

8. The indicating light unit according to claim 7 wherein said flux recovery and distributor mechanism has an outside surface closer to the optical plate, said outside surface having arrangements thereon configured to provide a predefined horizontal distribution of light.

9. The indicating light unit according to claim 1 wherein said optical plate has either an internal optical arrangement on an inside surface of the optical plate or an external optical arrangement on an outside surface of the optical plate away from the flux recovery and distributor mechanism for redirecting light rays leaving the flux recovery and distributor mechanism so that the light rays propagate with a mean direction substantially parallel to the longitudinal axis of the vehicle.

10. The indicating light unit according to claim 9 wherein said optical plate has prisms on the inside surface of the optical plate configured to redirect light rays leaving the flux recovery and distributor mechanism by total reflection.

11. The indicating light unit according to claim 9 wherein said optical plate has prisms on the inside surface of the optical plate, said prisms comprising a first face and a second face positioned at an angle from one another and are configured to allow the light rays entering the first face to be redirected by refraction while light rays entering the second face do not contribute to the illumination of the light unit.

12. The indicating light unit according to claim 9 wherein said optical plate has prisms on the outside surface of the optical plate configured to redirect some of the light rays by refraction.

13. The indicating light unit according to claim 1 wherein:

$$s = k1(s) - k2(s) \cdot \theta$$

where s is a curvilinear coordinate of said curved optical plate;

k1(s) is said evolution of illumination as a function of a curvilinear coordinate on the optical plate;

k2(s) is an evolution of said transmission coefficients of the optical arrangements of the optical plate in accordance with at least one of their curvilinear coordinates on the optical plate; and $\theta$ is an angle measured relative to a reference defining said orientation of a light ray from said light source.

* * * * *